April 4, 1967     N. L. KAHN ETAL     3,312,964
METER ENCODER-TRANSMITTER
Filed Dec. 3, 1962     6 Sheets-Sheet 1
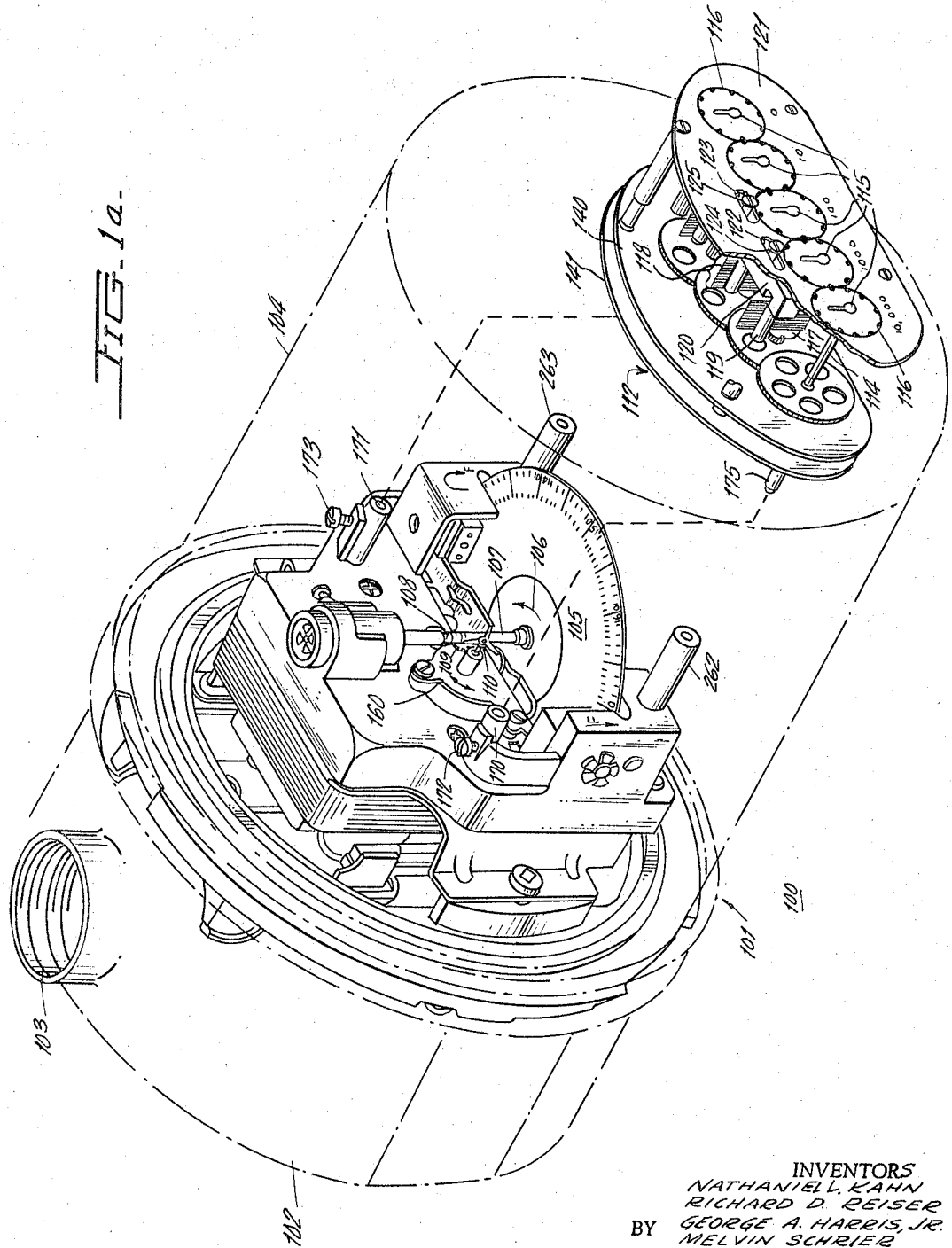
INVENTORS
NATHANIEL L. KAHN
RICHARD D. REISER
GEORGE A. HARRIS, JR.
MELVIN SCHRIER
BY
OSTROLENK, FABER, GERB & SOFFEN
ATTORNEYS

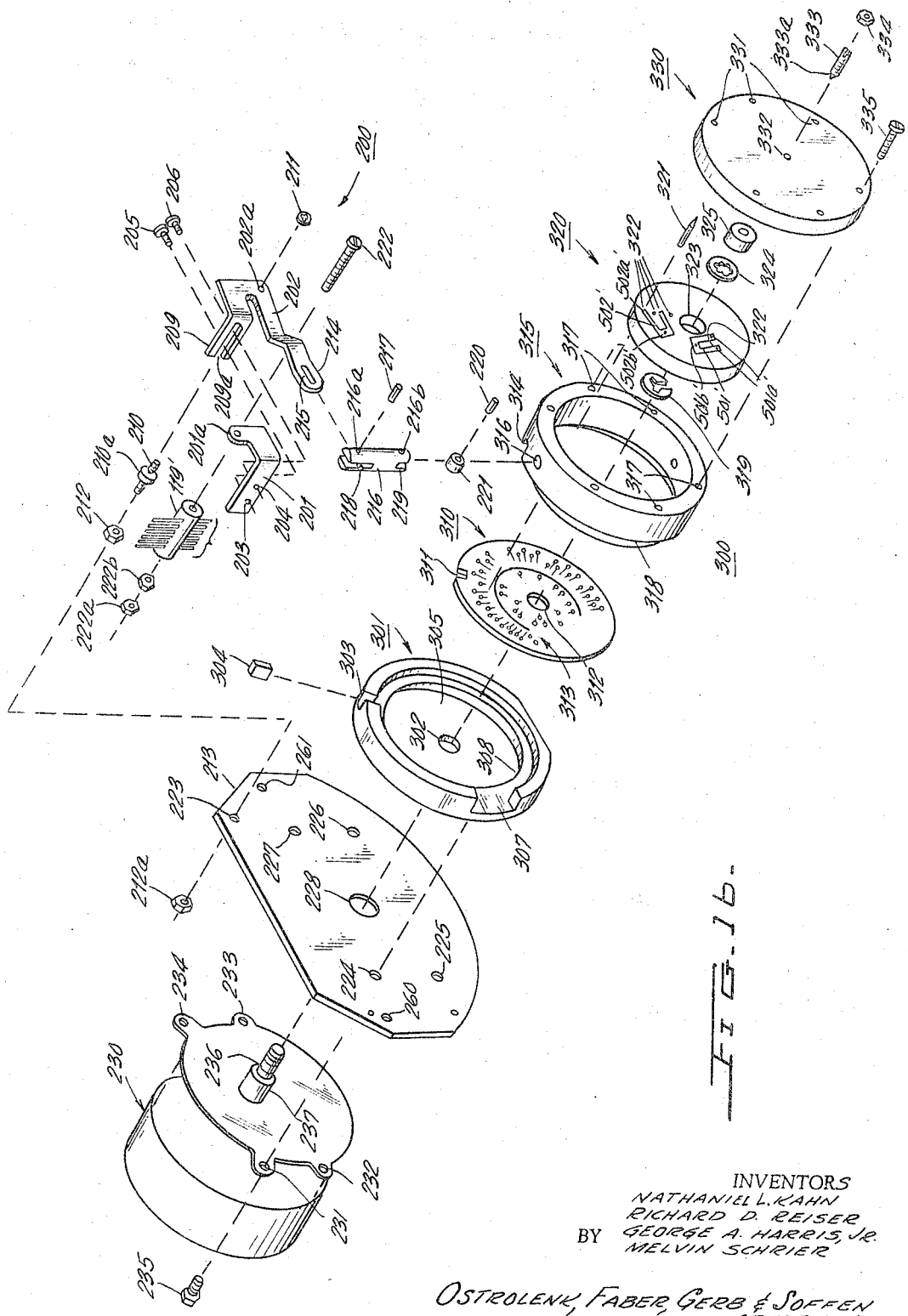

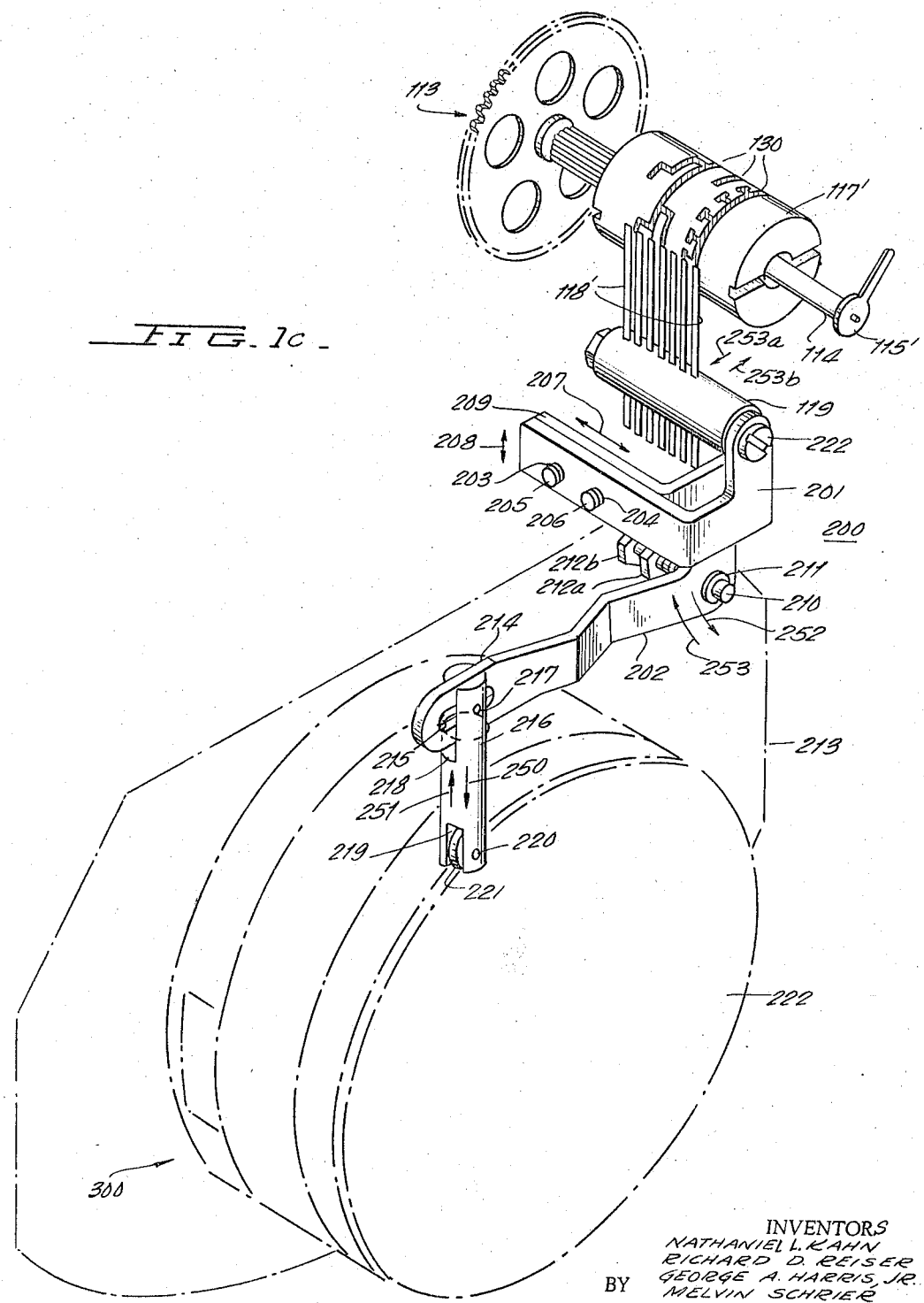

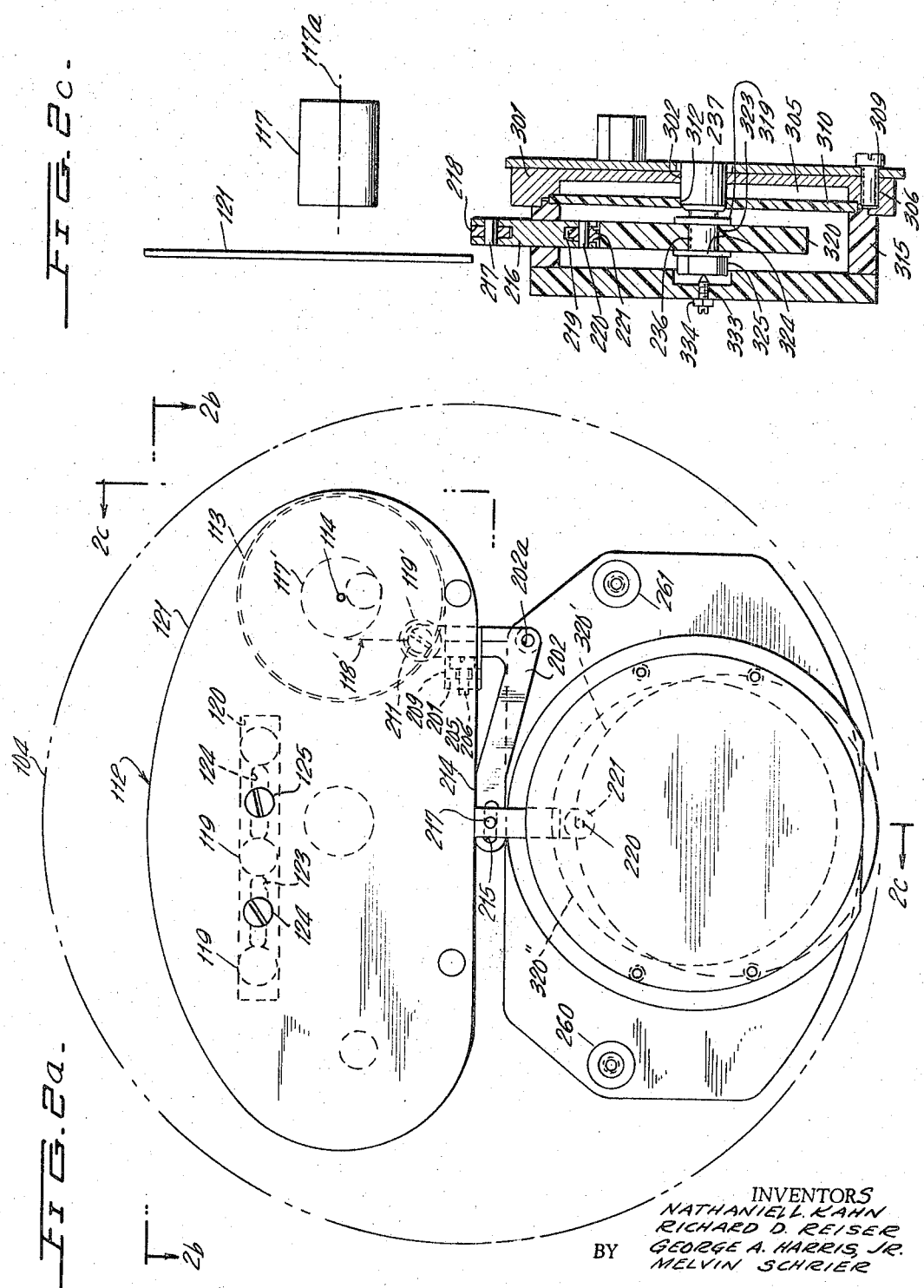

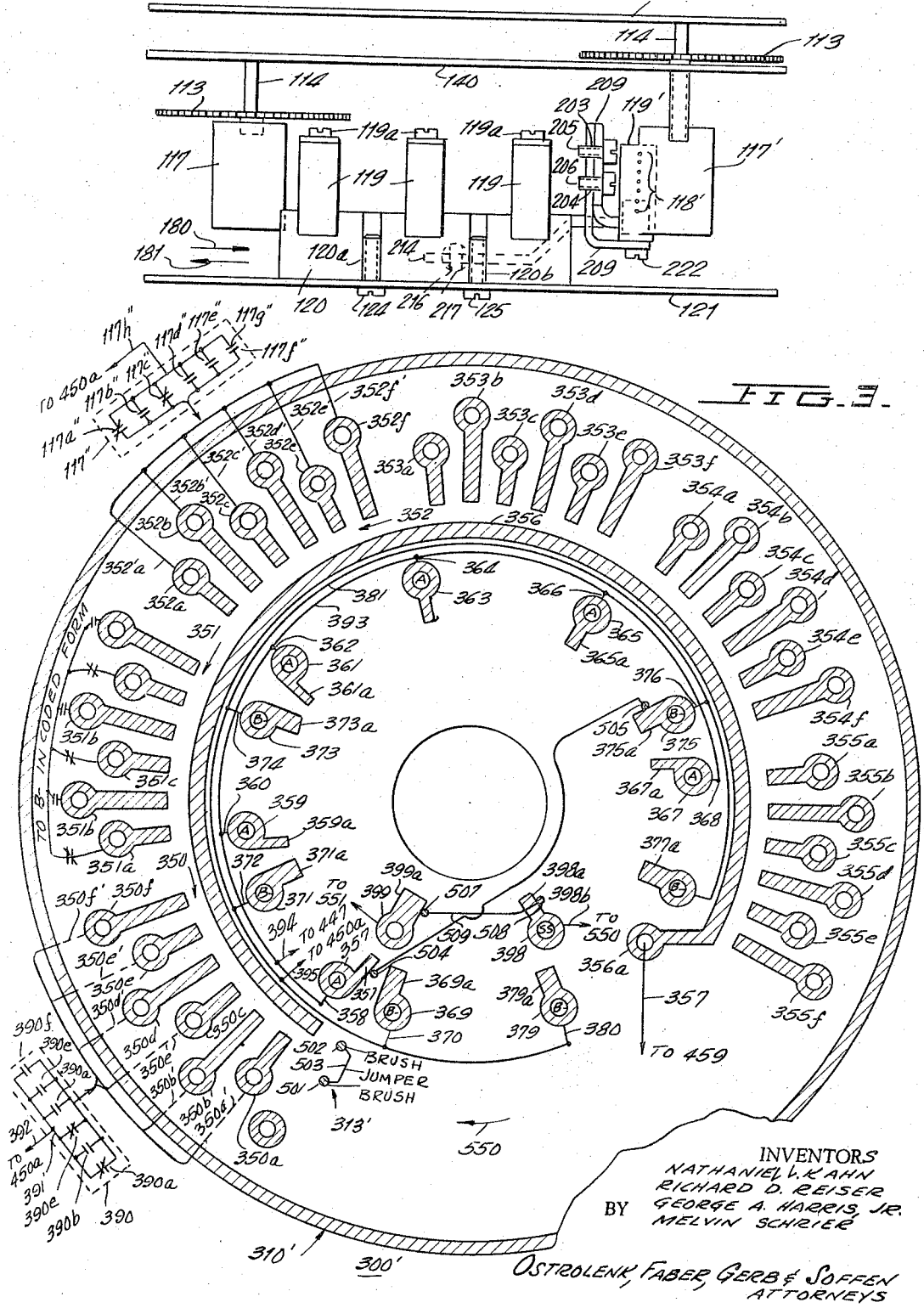

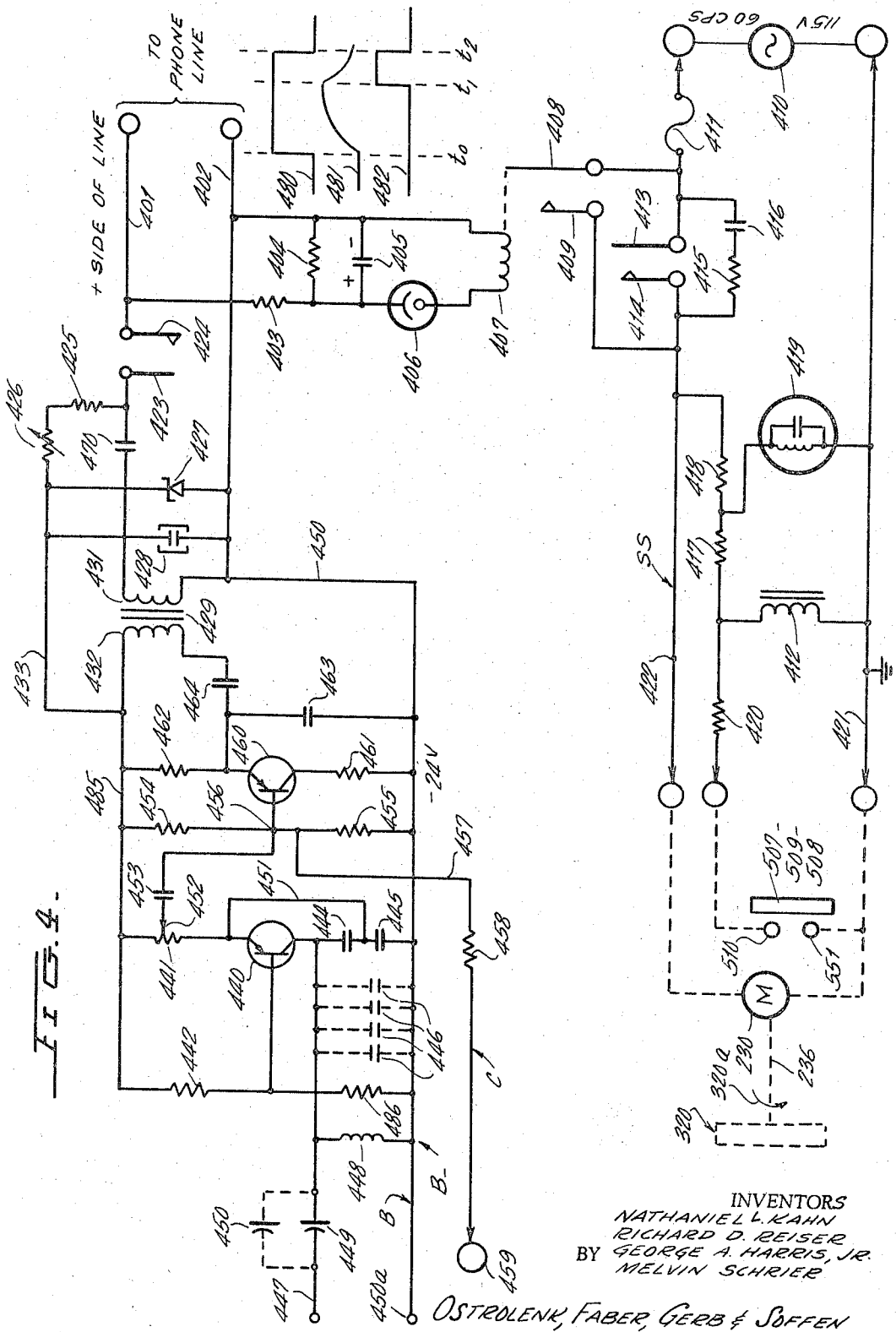

United States Patent Office 3,312,964
Patented Apr. 4, 1967

3,312,964
METER ENCODER-TRANSMITTER
Nathaniel L. Kahn, Glen Rock, Richard D. Reiser, Midland Park, and George A. Harris, Jr., Passaic, N.J., and Melvin Schrier, Bronx, N.Y., assignors, by mesne assignments, to Sangamo Electric Company, Springfield, Ill., a corporation of Delaware
Filed Dec. 3, 1962, Ser. No. 241,730
23 Claims. (Cl. 340—204)

This invention relates to communications systems and more particularly to a transmitter encoder for use in communications systems which is provided with a novel arrangement for encoding and transmitting information from a metering instrument while providing no interference whatsoever with normal meter operation, and further which is designed to operate in environments which impose severe space limitations and packaging restrictions upon the encoder transmitter-facility.

There have been numerous approaches for the development of a communications system adaptable for transmission of encoded data from a plurality of remote locations to a central location, or central locations, automatically upon transmit-request signals from the central location. The type of data gathering system desired is one in which encoded data representative of metered operations at each remote location is gathered in a predetermined sequence at the central location by initiating transmission through a transmit-request signal at each remote location. The function of each remote transmitter facility is that of preparing the metered quantities in a form suitable for transmission thereof, i.e. an encoding operation, and subsequently thereto to modulate a communications channel under control of the encoded form of the data to be transmitted for reception thereof by the central location receiving facility.

In addition to the above functions, the environment in which the encoder transmitter facility is operative imposes severe restrictions upon the permissible physical size of the encoder transmitter, thereby prohibiting the use of most prior art devices in applications of this sort.

One typical operating environment is that of a central data gathering system adapted for the collection of meter readings from a plurality of remote subscriber locations wherein the meter readings are those of utility meters such as, for example, electric company watthour meters wherein the meter reading represents the kilowatt hours which have been used by the subscriber location up to and including the instant at which the meter reading is being transmitted. In systems of this sort, it is extremely desirable to provide an encoder transmitter facility which is as compact as it may possibly be in order to greatly facilitate the installation, operation, maintenance, and unit cost, as well as keeping the interference with adjacent equipment to an irreducible minimum.

The best possible solution for the above problems is to provide an encoder transmitter of a size such that it is capable of being housed within the present utility meter housing so that no new space requirements present themselves, no modification is required in the meter housing, nor is any modification required in the metering instrument.

One such arrangement is set forth in detail in copending U.S. application Serial No. 227,806, entitled "Remote Transmitter Facility," filed Oct. 2, 1962 by Yanis et al., now Patent No. 3,268,884, and assigned to the assignee of the instant invention. The device set forth in the copending application employs encoding means for generating a binary coded representation of the shaft angle positions of the meter cyclometer, and further provides programming means which reads each encoder means in a sequential fashion, and utilizes the binary codes for the purpose of keying the transmitter output facility. The device set forth in the copending application is readily adaptable to be housed within the utility meter housing with no alterations being needed therein.

One problem confronting the prior art meter transmitters is to provide a facility which does not interfere in any way whatsoever with normal meter operations. As can be seen in the copending U.S. application mentioned above, the shaft angle encoders employed therein are mounted to the extended shafts of the cyclometer or register device and are further provided with sensing brush groups which make wiping contact with the shaft angle encoder devices for the purpose of generating the appropriate binary code group representative of the angular position of the shaft at any given instant. Since it is necessary for purposes of generating an accumulative meter reading by means of a cyclometer or like register, the shafts of the cyclometer are substantially continuously rotating or, at the minimum, are rotating during all times in which a subscriber location is using electrical energy supplied by the utility company. Since the shaft angle encoders are mounted to the shafts of the cyclometer device, and since a predetermined amount of contact pressure exists between the shaft angle encoders and the sensing brush groups cooperating therewith, this imposes a finite drag upon the cyclometer operation. Although the drag improsed on the cyclometer device is substantially small, it is nevertheless highly desirable to exert better control over this operation so as to completely eliminate any drag forces which may be imposed upon the cyclometer device of the meter.

The device of the instant invention, in addition to providing suitable encoding and transmitting capabilities, is further adapted to substantially eliminate drag forces imposed upon the utility meter cyclometer device during normal operation, and imposes this minute drag force only at the instant at which the data transmission operation occurs, which time interval is substantially less than two seconds in duration, and which may be controlled to be even smaller, depending upon the needs of the particular user.

The instant invention is comprised of an encoder assembly including a plurality of shaft angle encoder devices equal in number to the rotating shafts of the utility meter cyclometer, or like dial-face register having a gear train. Sensing means are provided for each shaft angle encoder for the purpose of sensing the binary coded information at any given instant and for transferring these binary code groups to the programming means of the transmitter facility.

Such cyclometer or like gear train dial-face registers are normally comprised of a plurality of rotatable shafts cooperatively linked by means of the gear train, wherein each such shaft is provided with a pointer member at one end thereof which cooperates with a dial face for the purpose of providing a visually observable reading of the measured quantity accumulated at any given instant of time. Assuming an example wherein such a cyclometer is provided with three dial faces, let it be assumed that the dial faces represent the "ones," "tens" and "hundreds" decimal positions. Thus, the cyclometer is capable of providing a decimal reading from 000 through 999. The shaft of the "ones" position, or least significant decimal digit position, therefore undergoes one full rotation of 360°, while the tens position shaft undergoes $\frac{1}{10}$ of a full rotation, or a traverse of a 36° arc. At the same time the "hundreds" position shaft undergoes $\frac{1}{100}$ the amount of rotation, or substantially a 3.6° arc. Thus, during normal operation the "ones," or least significant decimal digit position, undergoes the largest amount of rotation and, in addition thereto, the gear train associated therewith is driven by the "ones" position shaft in order to suitably control the "tens" and "hundreds" position shafts. Thus, any drag force imposed upon the register will be most significant if imposed upon the "ones" position rotatable shaft due to the largest amount of rotation per units registration of the register being experienced by the "ones" position encoder.

The encoder assembly of the instant invention is to designed as to place the sensing means for all shaft angle encoders beyond the least significant digit position in continuous sliding engagement with their cooperating shaft angle encoder devices.

The sensing means cooperating with the shaft angle encoder for the least significant decimal digit position, however, is operable so as to be disengaged at all times during which no transmission operation is being performed, and as to be engageable upon recipt of a transmit-request signal and subsequent transmission of the meter reading data transmission. The wiping engagement between the sensing means and the shaft angle encoder surfaces occupies substantially less than half the entire transmission cycle, and thereby imposes an extremely small drag upon the register device, and further imposes this drag for an extremely brief time duration. Thus, the meter facility has substantially no interference during the meter transmission operation, which is an extremely small time interval; and during normal operation, at which time no transmission operation is taking place, there is absolutely no interference with the normal operation of the facility meter.

The transmitter facility is further provided with novel programming means which is adapted to generate encoded information representing the identity of the subscriber location which is transmitting the meter reading data, whereupon the identifying code is impressed upon the transmitter facility output device for keying thereof. Simultaneously with this operation, the programming means brings the sensing means associated with the least significant decimal digit position into wiping engagement with the associated shaft angle encoder. The programming means is so designed that suitable contact pressure exists between the sensing means and the shaft angle encoder for the least significant decimal digit position during the transmission cycle. Substantially upon completion of transmission of the meter identifying code, the programming means then transmits the coded information from the shaft angle encoder of the least significant decimal digit position to the transmitter output device for suitable keying thereof. Upon completion of transmission of the binary code from the least significant decimal digit position, the programming means initiates movement of the movable sensing means away from its associated shaft angle encoder. During the time in which this operation is taking place, the programming means sequentially transfers the encoded data from the remaining shaft angle encoders of the encoder assembly, thereby completing the transmission cycle.

The disengagement of the movable sensing means from its associated shaft angle encoder takes place prior to the time during which the transmission cycle is completed, so that engagement between the movable sensing means and its associated shaft angle encoder exists for substantially less than the entire transmission cycle, thereby keeping the drag imposed upon the rotating shaft for the least significant decimal digit position to an absolute minimum. The contact pressure which does exist between the movable sensing means and its associated shaft angle encoder is an extremely small force so that even during the time of engagement thereof the drag force imposed upon the cyclometer device is extremely small.

The programming means is comprised of a rotatable eccentric cam which serves the dual function of operating the movable sensing means into engagement with its associated shaft angle encoder, and which is provided with sensing means which sequentially sweeps the binary groups of the shaft angle encoder devices which are connected to an array of conductive elements provided on an insulating member which elements are electrically connected to respective sensing means of each shaft angle encoder by suitable electrical conductors. The sensing members associated with the rotatable eccentric cam make wiping contact with the array of conductive elements and have associated therewith biasing means for providing suitable contact pressure between the sensing members and the conductive elements. The biasing means serve the further function of electrically connecting certain ones of the sensing members so as to electrically transfer the binary information from the programming means to the transmitter output device.

The transmitter output device is comprised of a normally deenergized tone transmitter circuit having a monitoring means which is responsive to a transmit-request signal from the receiver location for energizing the tone generating circuit and for operating the transmitter programming means. The tone generator circuit is electrically connected to the sensing members of the rotating eccentric cam, and is adapted to generate signals of predetermined frequencies under control of the coded information to be transmitted. Further means are provided for transmitting the generated frequency signals to the communications channel, which in the preferred embodiment is also utilized to supply the necessary biasing voltages for the output facility.

Further means are provided in the transmitter output facility for deenergizing the encoder transmitter device automatically upon completion of the transmission cycle. Second deenergizing means are provided for deenergizing the encoder transmitter device, if for any reason, the primary deenergizing means is inoperative. Thus, the transmitter output device becomes operative only upon receipt of a transmit-request signal, and is adapted to automatically deenergize itself upon completion of the transmission cycle.

It is, therefore, one object of the instant invention to provide an encoder transmitter facility for data gathering communications systems which is adapted to encode and transmit data from a metering instrument and which does not interfere in any manner with normal operations of the metering instrument.

Another object of the instant invention is to provide an encoder transmitter facility for data gathering communications systems wherein the encoder means and programming means for the transmitter facility are adapted to be mounted within the housing of the metering instrument.

Another object of the instant invention is to provide an encoder transmitter facility for data gathering communications systems wherein the novel encoder assembly provides substantially no drag to the rotating pointer shaft of the metering instrument register means.

Still another object of the instant invention is to provide a novel encoder transmitter facility for data gathering systems which is adapted to engage the encoder for the least significant decimal digit position of the metering instrument only during the data transmission cycle.

Still another object of the instant invention is to provide a novel encoder transmitter facility for data gathering systems which is comprised of a programming assembly which is adapted to engage the shaft angle encoder device of the least significant decimal digit position for a period which is substantially less than the entire data transmission cycle of the transmitter facility.

Another object of the instant invention is to provide an encoder transmitter facility for data gathering systems having novel programming means for transferring data from a plurality of encoder devices in order to key a transmitter output device.

Still another object of the instant invention is to provide an encoder transmitter facility for data gathering systems having a novel tone generator circuit for generating electronic signals of predetermined frequencies under control of the transmitter encoder assembly.

Still another object of the instant invention is to provide an encoder transmitter facility for data gathering systems having novel means for energizing the encoder transmitter facility upon receipt of a transmit-request signal.

Another object of the instant invention is to provide an encoder transmitter facility for data gathering systems having novel means for deenergizing the encoder transmitter facility upon completion of the data transmission cycle.

Still another object of this invention is to provide an encoder transmitter facility having a novel transmitter output device which is powered by the communications channel.

These and other objects of the instant invention will become apparent when reading the accompanying description and drawings in which:

FIGURE 1a is a perspective view of a metering instrument which may be employed in cooperation with the encoder transmitter device of the instant invention.

FIGURE 1b is an exploded view of the programming means of the instant invention.

FIGURE 1c is a perspective view showing the programming means of FIGURE 1b fully assembled.

FIGURE 2a is a front view of the meter assembly of FIGURE 1a showing the programming means positioned therein.

FIGURE 2b is a top view of the programming means and encoding assembly of FIGURE 2a.

FIGURE 2c is a sectional view of the programming means of FIGURE 2a taken along the lines 2–2′.

FIGURE 3 is a detailed view of the printed circuit disc and rotating eccentric cam of the programming means of FIGURES 1b and 1c.

FIGURE 4 is a schematic diagram of the tone generator output device of the instant invention.

Referring now to the drawings; FIGURE 1a shows a typical utility company watthour meter assembly 101 in which the encoder transmitter arrangement 100 may be installed. While the encoder transmitter facility of the instant invention will be described herein in connection with such a watthour meter installation, it should be understood that the device of the instant invention is readily adaptable for use in many other meter installations, and is not limited, therefore, to use with watthour meters.

The watthour meter 101 may be of any well known type such as, for example, the watthour meter type described in the copending U.S. application Serial No. 227,806, Meter Encoder-Transmitter, mentioned previously. Basically, the watthour meter 101 is comprised of a rear housing portion 102 having a suitable opening 103 for receipt of the incoming power lines. The watthour meter is appropriately wired to the incoming lines so that all electrical power delivered to the subscriber location passes through the watthour meter instrument for suitable recording thereof. The front portion of the watthour meter device is provided with a transparent or glass envelope 104 which acts to suitably seal the watthour meter device, while at the same time enabling visual observance of the meter instrument, both for obtaining visual meter readings and for maintenance or other purposes.

The watthour meter instrument 101 operates in such a manner that use of electrical energy at a subscriber location causes rotation of disc 105 and shaft 107, rigidly attached to disc 105, such that both members rotate in the direction shown by arrow 106. Shaft 107 is provided with a wormgear 108 which cooperates with a circular gear member 109 partially enclosed within housing 160. Engagement between straight gear 108 and circular gear 109 operates in such a manner that upon rotation of shaft 107 gear 109 rotates in the direction shown by arrow 161. This rotation is directly imparted to a shaft 110 rigidly secured for rotation to gear 109. The free end of shaft 110 has a star gear member 111 affixed thereto which cooperates in any well known manner with the gear train 113 of cyclometer (or register) device 112. It should be fully understood that while the arrangement of FIGURE 1a shows the use of a cyclometer device 112, it should be understood that any other type of dial reading device having a similar gear train may be employed in the meter installation of FIGURE 1a.

The cyclometer 112 is provided with suitable means (not shown) positioned to the rear of the rearmost plate 141 of cyclometer 112 which cooperates with star gear 111 in order to couple rotation of star gear 111 to the gear train arrangement 113 of the cyclometer 112. The gear train 113 is adapted to impart rotation to a plurality of rotatable shafts such as, for example, the shaft 114.

In the example of FIGURE 1a, five such rotating shafts are employed. However, it should be understood that a greater or lesser number of rotating shafts may be used. Each of the rotating shafts 114 is provided at its free end with a pointer 115 rigidly secured thereto wherein each pointer cooperates with an associated circular dial face properly graduated so as to provide a visual reading of the total number of kilowatt hours which has been used by the subscriber location.

In the example of FIGURE 1a, five such dial faces are provided wherein each dial face is graduated to provide readings of the decimal numbers 0 through 9. The five dial faces reading from right to left provide the decimal numbers for forming five decimal digit positions, namely, the "ones" position, "tens" position, "hundreds" position, "thousands" position and "ten-thousands" position. Thus, the cyclometer arrangement 112 of FIGURE 1a is capable of providing any decimal reading from 00000 to 99999 or, in other words, is capable of providing a decimal reading range of 100,000.

Each such rotating shaft 114 is designed to have a length sufficient to receive a shaft angle encoder such as the shaft angle encoder 117 which is affixed to the shaft occupying the thousandth decimal digit position. While the shaft 114 of FIGURE 1a has been shown to be bare, it should be understood this shaft normally receives a shaft angle encoder 117, but in this case it has been removed for purposes of clarity. Each shaft angle encoder performs the function of generating a binary coded representation of the angular position of its associated shaft, and hence provides a binary coded representation of the decimal reading of its associated shaft pointer 115. Shaft angle encoders of this type are fully set forth in copending U.S. application Serial No. 125,247, entitled "Code Stack Assembly," filed July 19, 1961, by Brothman et al., and assigned to the assignee of the instant invention. Since the above mentioned copending application provides a detailed explanation of such shaft angle encoders, a detailed description will be omitted from the disclosure, but it should be understood that the shaft angle encoder is provided with a specific conductive configuration about the cylindrical surface (or flat surface, in the case of a shaft angle disc encoder) the arrangement of which, when coupled with a suitable constant voltage source, generates a plurality of binary bits representative of the angular position of the associated shaft at any given instant.

The binary coded information is sensed by the sensing members 118 which are provided for each shaft angle encoder. Sensing members 118 comprise a plurality of individual sensing fingers or brushes which are adapted to make wiping contact with the surface of the shaft angle encoder 117. The sensing members 118 are embedded within a positioning post member 119 which is adjusted in such a manner as to provide suitable contact pressure between the contact surfaces of the rotating shaft angle encoders 117 and the associated sensing members 118 are connected by suitable flexible conductors (not shown) to the encoder transmitter programming means 300 shown in FIGURES 1b and 1c for the purpose of transferring the coded information between the encoding means and the transmitter output signal generating circuit 400 of FIGURE 4, as will be more fully described.

The cyclometer 112 is provided with suitable projections 175 (only one of which is shown in FIGURE 1a) which are positionable in the openings of projections 170 and 171 of the watthour meter instrument 101. Suitable fastening members 172 and 173 respectively, are provided with the posts 170 and 171 for the purpose of rigidly securing cyclometer 112 to meter 101 after adequate positioning thereof. The actual physical position occupied by the cyclometer device 112 relative to the meter 101 is more clearly shown in FIGURE 2a.

Each sensing member positioning post 119 is secured to a movable block 120 by means of fastening members 119a in the manner shown in FIGURE 2b. Movable block 120 is provided with tapped apertures 120a and 120b for the receipt of fastening members 124 and 125 respectively. Fastening members 124 and 125 cooperate with elongated slots 122 and 123 respectively, of dial face plate 121 to permit linear movement of moveable block 120 in the direction shown by arrows 180 and 181 of FIGURE 2b.

This arrangement permits the sensing members 118 embedded in each positioning post 119 to likewise be moved in the directions as shown by arrows 180 and 181, thereby permitting simultaneous adjustment of the contact pressures between each sensing member group and its associated shaft angle encoder such that the contact pressure is adjusted for all shaft angle encoder groups in a single operation. By tightening fastening members 124 and 125, the position at which the suitable contact pressure is achieved may be maintained since the tightening of fastening members 124 and 125 secures movable block 120 to the dial face plate 121.

As previously described, all of the sensing member groups 118, with the exception of the sensing member group for the least significant decimal digit position (i.e., the one digit position) remain in constant sliding engagement with their associated shaft angle encoder member 117.

Reference is now made to FIGURES 1b and 1c for the operation of the movable sensing member group 118' shown therein. Referring now to FIGURES 1b and 1c, the movable sensing member operating means 200 is comprised of an L-shaped bracket 201 whose upper end is provided with a suitable opening 201a for receiving fastening member 222. Fastening bolt 222 is adapted to be received by a suitable opening in positioning post 119, and has its opposite end secured by means of washer 222b and fastening nut 222a, thereby securing positioning post 119' to bracket 201. Bracket 201 is further provided with suitable tapped apertures 203 and 204 for receipt of fastening members 205 and 206 respectively. These fastening members are provided for securing the upper end 209 of rotatable bracket 202. The upper arm 209 of bracket 202 is provided with an elongated slot 209a adapted to receive and be secured by fastening members 205 and 106.

The purpose of elongated slot 209a is to permit relative horizontal positioning between bracket 201 and rotatable bracket 202 in the directions shown by arrow 202. This enables the sensing members 118' to be moved to the proper positions relative to the conductive coating 130 provided on the surface of shaft angle encoder member 117'. The knee portion of rotating bracket 202 is provided with a suitable opening 202a for receipt of pivot pin 210.

Pivot pin 210 is provided for pivotally mounting rotatable bracket 202 to the mounting plate 213 shown in both FIGURES 1b and 1c. Mounting plate 210 is provided with a suitable opening 223 for receiving pivot pin 210. Flange 210a of pivot pin 210 shoulders against the mounting plate 213, and its forward portion extends through opening 223 of mounting plate 213 and opening 202a of rotatable bracket 202. Bracket 202 is secured for rotational movement to mounting plate 213 by locking member 211 which makes a pressure fit with the forward end of pivot pin 210. The rearward end of pivot pin 210 is suitably threaded and extends through opening 223 of mounting plate 213, and threadedly engages fastening nut 212 to rigidly secure pivot pin 210 to mounting plate 213.

This arrangement enables rotating arm 202 to be rotated about pivot pin 210 in the direction shown by arrows 252 and 253 respectively. The lower end 214 of rotating arm 202 is provided with an elongated slot 215 for slidably engaging reciprocating rode 216. Reciprocating rod 216 is provided with a slot 218 at its upper end which is adapted to receive the left-hand portion 214 of rotating arm 202. The upper end of reciprocating pin 216 is further provided with an opening 216a for receipt of connecting pin 217 which is adapted to be received by elongated slot 215 of arm 214. This arrangement slidably couples rotating arm 202 to reciprocating pin 216 for a purpose to be more fully described.

The lower end of reciprocating pin 216 is provided with a second slotted portion 219 and a second suitable opening 216b such that the slotted portion 219 is adapted to receive the roller member 221, and the opening 216b receives pivot pin 220 which rotatably couples roller member 221 within the slotted portion 219 of reciprocating pin 216.

Reciprocating pin 216 is adapted to cooperate with the eccentric cam member 320 (to be more fully described) such that the roller member 221 follows the surface of eccentric cam 320 which causes pin member 216 to move either in the upward or downward vertical direction shown by arrows 251 and 250 respectively, of FIGURE 1c, depending upon the angular position of eccentric cam 320.

The operation of the movable sensing member positioning means 200 is as follows:

Assuming that the reciprocating pin 216 has its roller member 221 riding upon eccentric cam 320 such that reciprocating pin 216 is urged in the upward vertical direction shown by arrow 251, this movement is imparted to arm 214 of rotating member 202, causing member 202 to rotate clockwise, as shown by arrow 253, about its pivot pin 210. This causes the upper portion of rotating arm 202 and, hence, L-shaped member 201, positioning member 119' and sensing members 118' to be moved in the direction shown by arrow 253b. This urges sensing members 118' into wiping engagement with the surface of shaft angle encoder 117', thereby placing the shaft angle encoder 117' in a condition in readiness for transfer of the encoded information from encoder 117' through sensing members 118' and suitable flexible conductors (not shown) connected to the free end of sensing members 118' for transfer of the binary coded information to the programming means 300 of FIGURE 1d.

Upon completion of transmission of the encoded information from the "ones" decimal digit position, the eccentric cam 320 rotates in such a manner as to permit reciprocating pin 216 to be moved in the downward vertical direction shown by arrow 251 under the influence of gravity and also under the influence of the contact pressure existing between sensing members 118' and the surface of shaft angle encoder 117'. The downward vertical movement of reciprocating pin 216 is further imparted to arm 202 causing it to rotate in the counter-clockwise direction shown by arrow 252. This causes the upper portion 209 of arm 202 and, hence, L-shaped member 201, positioning post 119', and sensing members 118' to be moved in the direction shown by arrow 253a.

causing the sensing members 118' to move out of sliding engagement with the surface of shaft angle encoder 117'. This operation occurs a predetermined time period before the completion of the transmitter encoder transmission cycle and thereby completely releases shaft angle encoder 117 and hence its associated rotatable shaft 114 from any drag forces being exerted thereupon.

Thus, the cyclometer device 112 experiences no drag whatsoever during the period at which the transmitter encoder facility is in the deenergized state (i.e., normal operating state) allowing the watthour meter device 101 to operate in the same manner as it would operate in the complete absence of any such transmitter encoder facility being coupled therewith.

The wiping engagement of the sensing members 118' with its associated shaft angle encoder 117' is further operated so that wiping engagement exists between these members during an interval which is less than half that of the total transmission cycle.

In the embodiment of the instant invention, the transmit cycle period is less than two seconds in duration, and hence it can be seen that the shaft angle encoder 117' is wipingly engaged by the sensing members 118' for a period less than one second.

If it is desired to provide operating speeds greater than the instant device, it can be seen that this engagement time interval can be substantially diminished below the arrangement given for one preferred embodiment of the instant invention.

Reference is now made to FIGURES 1b, 1c and 2c respectively, which show the programming means of the instant invention. The programming means 300 is comprised of a housing arrangement including a base plate member 301 which is provided with a suitable tapped aperture 306 (see FIGURE 2c) for receipt of fastening member 309. Tapped aperture 306 and fastening member 309 permit rigid securement of base member 301 to mounting plate 213. Mounting plate 213 is further provided with openings 224 through 227 for the receipt of fastening members such as, for example, the fastening members 309 and 235 which secure a motor driving means 230 to the mounting plate 213.

Motor means 230 is provided with suitable eyelets 231 through 234 which are angularly oriented with the openings 224 through 227 respectively, and further for the receipt of the fastening means such as, for example, the fastening means 309 and 235 through said eyelets 231 through 234. Motor means 230 is provided with a cylindrical projection 237 through which the motor shaft 236 is positioned.

A centrally located opening 228 is provided in mounting plate 213, the dimensions of which are sufficient to permit passage therethrough of both shaft 236 and cylindrical projection 237. Base member 301 is likewise provided with an opening 302 having a diameter which is sufficient for the receipt of cylindrical projection 237.

Base member 301 is provided with a cavity or depression 305 having a circular ledge 308 upon which a printed circuit disc 310 is positioned. Printed circuit disc 310 has a diameter sufficient to be received by the base member 301 such that it may rest upon the circular ledge 308. Disc 310 is suitably angularly oriented by means of notch 311 provided in disc 310 which is suitably aligned with a notch 303 provided in base member 301.

A suitable locking segment or block 304 is inserted through notch 303 and is wedged still further so as to be inserted into notch 311 thereby preventing printed circuit disc 310 from undergoing any rotational movement within the confines of base member 301. A substantially larger notched portion 307 is provided in base member 301 enabling suitable flexible conductors (not shown) to be brought into the confines of the programming means housing asembly for electrical connection with the printed circuit configuration 313 provided on printed circuit disc 310.

A centrally located opening 312 is provided in disc 310 and has a diameter sufficient for the receipt of cylindrical projection 237 of motor 230. The printed circuit arrangement 313 of disc 310 cooperates with the rotatable eccentric cam 320 and the encoder assembly 100 in order to sequentially sweep and read out encoded information from each shaft angle encoder and transfer this binary coded data to the transmitter facility signal frequency generating circuit of FIGURE 4 for the keying operation thereof in a manner to be more fully described.

The housing assembly of the programming means 300 is further comprised of a cylindrical shell 315 having a rearwardly extending portion 318 for receipt thereof by the depression or cavity 305 of base member 301 such that the projection 318 abuts against the circular ledge 308 of base member 301. The rearwardly extending portion of cylindrical shell 315 is likewise provided with a notched portion 314 which cooperates with the notched portion 303 of base member 301 for receipt of the wedging block 304. This further serves to provide suitable angular orientation for cylindrical shell 315 for a purpose to be more fully described. The upper surface of cylindrical shell 315 is provided with an opening 316 for receiving reciprocating pin 216. The angular orientation of cylindrical shell 315 is thereby significant since it is important that reciprocating pin 216 be aligned so that it is in a substantially vertical position and so that it may undergo linear movement only in the vertical direction.

The front surface of cylindrical shell 315 is provided with a plurality of tapped apertures 317 for receipt of fastening members such as, for example, fastening members 335 in order to secure transparent cover plate 330 of the housing for programmer means 300 in order to provide a compact substantially airtight housing for the programmer assembly 300. Face plate 330 is made of any suitable transparent material and is provided with opening 331 for the receipt of fastening members 335 which are utilized to rigidly secure face plate 330 to cylindrical shell 315.

Programming means 300 is further comprised of rotatable eccentric cam member 320 having a centrally located opening 323 for receipt of motor shaft 236. Eccentric cam 320 is rigidly secured to motor shaft 236 by means of a first washer locking member 319 which is rigidly secured to shaft 236 and which abuts the rearward surface of eccentric cam 320. A second washer member 324 and threaded nut member 325 are positioned on shaft 236 of motor 230 such that nut 235 threadedly engages the forwardmost end of shaft 236 thereby rigidly securing eccentric cam member 320 to motor shaft 236 such that any rotation of shaft 236 is directly imparted to eccentric cam 320.

Eccentric cam 320 is provided with a plurality of smaller openings 322 for the receipt of sensing pins such as, for example, the sensing pin 321. The sensing pins are positioned in the opening 322 in such a manner that their left-handmost ends make wiping contact with the printed circuit configuration 313 upon the disc member 310. Thus upon energization of motor 230, shaft 236 begins rotation causing eccentric cam member 320 to rotate therewith. This causes the sensing pins such as, for example, the sensing pin 321 which makes sliding engagement with the printed circuit surface 313 of disc 310 to sequentially sweep and read out the binary coded information electrically coupled to the printed circuit configuration of the printed circuit disc 310 by suitable flexible conductors (not shown) which are coupled between the printed circuit configuration of disc 310 and the sensing members 118 of the shaft angle encoder assembly of FIGURE 1a in a manner to be more fully described.

The eccentric cam 320 is further provided with the flexible conductors 501'–502' which are coupled at their first ends 501b'–502b' by suitable fastening means to the forward surface of the cam member 320. The free ends 501a'–502a' and 501a'–502a' abut against the ends of the associated sensing pins such as, for example, the forward end of sensing pin 321. The flexible conductors 501'–502' are formed of conductive material which is sufficiently resilient so as to enable these flexible members to act as biasing means so as to bias the sensing pins such as, for example, the sensing pin 321 in the direction of the printed circuit discs 310 in order to insure suitable contact pressure between the sensing pins and the conductive segments which they sweep. The flexible conductors likewise act as the conductive means for electrically connecting the sensing pins against which the free ends of each of the flexible members 501'–502' abut in order to establish electrical contact between the sensing pins. Thus the flexible members act as jumper means for the sensing pins which they engage. It can therefore be seen that the flexible members 501'–502' provide the dual functions of maintaining suitable contact pressure between the sensing pins and the conductive segments on the printed circuit disc 310 which they sweep during the transmission cycle, as well as acting as the jumper means between the pins with which these flexible members are associated.

Face plate 330 is further provided with a centrally located tapped aperture for the receipt of centering pin 333. Centering pin 333 threadedly engages tapped aperture 332 such that its forward tapered end 333a is partially inserted into the tapped aperture of fastening nut 325. Centering pin 333 acts to rigidly position shaft 236 of motor 230 so that shaft 236 will be prevented from experiencing any wobbling motion during rotation thereof.

Locking nut 334 threadedly engages positioning pin 333 and is provided to lock positioning pin 333 in any predetermined position after positioning pin 333 has been inserted to a suitable degree into the tapped aperture of fastening nut 325. Thus, locking nut 334 suitably secures positioning pin 333 from experiencing any linear movement after suitable setting thereof.

The eccentric cam 320 is provided with a suitable eccentric surface 326 upon which the roller member 221 of reciprocating pin 216 makes sliding engagement. Thus, the roller member 221 of reciprocating pin 216 follows the surface 326 of cam 320 which cam controls the vertical movement of reciprocating pin 216 in order to move the sensing members 118' into or out of sliding engagement with its associated shaft angle encoder 117'.

Reference will now be made to the transmitter output device 400 and the associated programming means 300, and more specifically, the printed circuit disc 310 and eccentric cam 320 of the programming means, which devices can best be seen in FIGURES 3 and 4.

The transmitter encoder output device 400 is comprised of incoming lines 401 and 402 which connect the output device with the communications channel, one example of which in the instant preferred embodiment is a two-wire telephone line (not shown) connected between the remote location and the receiver location (not shown). In order that the transmitter encoder device be automatically responsive to a transmit-request signal, circuit 400 is provided with a monitoring device comprised of resistor 403 connected to the positive side of the incoming line 401 having its opposite terminal connected in series with resistor 404, the opposite end of which is connected to the reference bus incoming line 402. A capacitor member 405 is connected in parallel with resistor 404, and a series connected neon glow tube 406 and relay coil 407 are likewise connected in parallel across resistor 404. Relay winding 407 operates movable contact 408 into engagement with stationary contact 409 (contacts 408 and 409 being normally in the disengaged position) in the following manner:

In normal operating conditions, the phone line (not shown) normally presents a 48-volt or lower constant voltage bias to the positive side line 401. The transmit-request signal impressed upon lines 401 and 402 is a step voltage 480 having a magnitude which is at least double the magnitude of the normal 48-volt bias impressed across lines 401 and 402. Substantially all of this 48-volt drop appears across resistance 404 having an ohmic value which is many times greater than the ohmic value of resistor 403. The voltage drop across resistor 404, however, is insufficient to cause neon glow tube 406 to fire. Thus, although capacitor 405 is charged to a predetermined voltage level this level is insufficient to ignite glow tube 406. This condition causes the transmitter encoder device to remain in a deenergized state in a manner to be more fully described.

The imposition of the transmit-request signal 480 at time $t_0$ causes capacitor 405 to begin charging. Capacitor 405 continues charging at a rate determined by R–C values of 403 and 405 until at time $t_1$ the voltage developed across capacitor 405 becomes sufficient to ignite the neon glow tube 406 which becomes conductive, shown by the current waveform 482. The current flowing through glow tube 406 likewise passes through relay coil 407 causing movable contact 408 to be drawn in the direction towards stationary contact 409. This closes a circuit between the A.-C. voltage source 410 which circuit may be traced as follows: A.-C. source 410, protecting fuse 411, closed contact pair 408–409, conductor 422, resistance 418, resistance 417, solenoid 412 and ground bus 421 which returns to A.-C. source 410. The energization of relay coil 412 causes contact closure of contact pair 413–414, contact 413 being urged to move under control of relay coil 412 into engagement with stationary contact 414. Thus, contact pair 413–414 is closed in parallel across contact pair 408–409. As soon as current flows through the neon glow tube 406 and relay coil 407 at time $t_1$, capacitor 405 begins to discharge rapidly, as shown by waveform 481, so that at time $t_2$ the voltage across capacitor 405 is insufficient to maintain neon glow tube 406 in the conductive state. Thus, at time $t_2$ current through neon glow tube 406 rapidly falls to zero, as shown by waveform 482, causing relay coil 407 to become deenergized, thus moving movable contact 408 out of engagement with stationary contact 409. However, the time duration from time $t_1$ to $t_2$ is sufficient to permit energization of relay 412 which locks itself into energization by closure of the contact pair 413–414. Thus, the opening of contact pair 408–409 does not cause an open circuit in the aforementioned current path which contains the relay coil 412.

The closure of relay contacts 408–409, and immediately subsequent thereto contacts 413–414, also establishes a second current path through bus 422 to one terminal of motor means 230, the opposite terminal of which is returned to reference bus 421. This energizes motor means 230 causing rotation of motor means shaft 236 which, in turn, drives the eccentric cam 320 into rotation as shown by arrow 320a, thus initiating the transmission cycle of the encoder transmitter device of the instant invention.

A third current path established, together with the two current paths recited above, exists from bus 422 through resistance 418 and time delay unit 419 to reference bus 421 which returns to the negative terminal of A.-C. source 410. Time delay unit 419 operates as a secondary means for deenergizing the encoder transmitter of the instant invention in a manner to be more fully described.

At time $t_2$, the transmit-request signal 480 is removed from lines 401 and 402, thereby causing line 401 to return to its normal operational level of approximately +48 volts. The energization of relay coil 412, in addition to closing contacts 413–414, simultaneously causes movement of movable contact 423 into engagement with stationary contact 424. The closure of contact pair 423–424 places a portion of the +48-volt D.-C. bias upon the signal generating circuit by means of the circuit extending from line 401 through closed contact pair 423–424, resistance 425 and 426, and conductor 433 to bus 485.

A Zener diode 427 has its cathode terminal connected to conductor 433 and its anode terminal connected to incoming conductor 402, and has a voltage-current characteristic such as to maintain a 24-volt D.-C. level at conductor 433. This 24-volt D.-C. level is impressed by means of bus 485 upon transistors 440 and 460, respectively.

Capacitor 428 is connected between conductor 433 and incoming line 402 for the purpose of filtering out any distortion which may be impressed upon the incoming line 401 by the transmitter output. Transistor 440 has its emitter electrode connected to bus 485 by means of resistance 441, and has its collector electrode connected to bus 450 by means of series connected capacitors 444 and 445. Bus 450, in turn, is electrically connected to incoming line 402. Inductor member 448 is connected in parallel between bus 450 and the collector electrode of transistor 440 for the purpose of establishing a predetermined resonant frequency with the series connected capacitors 444 and 445. Transistor 440 is biased into the conductive state by means of a voltage divider circuit comprised of resistors 442 and 486 which have their common terminal connected to the base electrode of transistor 440. Transistor 440 is made to oscillate by the connection between the common terminals of capacitors 444 and 445 by means of conductor 451, the opposite end of which is connected to the emitter electrode of transistor 440. A bank of capacitors 446 connected in parallel with one another are, in turn, connected in parallel with conductor 448 and the series combination of capacitors 444 and 445 for the purpose of tuning or adjusting the frequency at which the transistor 440 will resonate.

A potentiometer formed by means of movable terminal 452 which cooperates with resistance 441 electrically connects the output of transistor 440 to the base electrode of transistor 460 via the capacitor member 453. Capacitor member 453 provides A.-C. coupling between the two transistor stages.

A second voltage divider circuit is comprised of resistors 454 and 455 connected between buses 450 and 485 at their first ends and having a common connection at their opposite ends to a terminal 456 which is connected to the base electrode of transistor 460. The ohmic values of resistors 454 and 455 are such that they bias transistor 460 into conduction but not into saturation.

Transistor 460, however, is keyed into saturation under control of the programming means and the shaft angle encoder in a manner to be more fully described. The transistor 460 is connected between buses 485 and 450 by means of resistor 462 which is connected to the emitter electrode of transistor 460, and by resistor 461 connected to the collector electrode of transistor 460.

A capacitor 464 A.-C. couples the output of the circuit comprised of transistor 460 to the primary winding 432 of a transformer 429. Capacitor 463 is connected between the emitter electrode of transistor 460 and bus 450 for the purpose of maintaining a constant voltage level therebetween during conduction of transistor 460 and thereby blocks any D.-C. voltage. Any signals impressed upon the primary winding 432 of transformer 429 are inductively coupled to the secondary winding 431 of transformer 429 which is connected across the incoming lines 401 and 402. This arrangement impresses the signals from the output circuit of transistor 460 upon the lines 401 and 402 which, in turn, impress these signals upon the communications channel (not shown), and subsequent thereto to the receiver facility (not shown) of the data gathering communications system.

The transformer means performs the function of providing D.-C. isolation between the telephone lines 401 and 402 of the oscillator circuit comprised of the transistors 440 and 460. The capacitor 470 coupled between one terminal of the transformer secondary 431 and line 401 further provides the function of blocking any D.-C. signal from the transformer circuit while the capacitor 428 connected in parallel with the Zener diode 427 filters any A.-C. signal from the constant supply means provided by the Zener diode.

Parallel connected capacitors 449 and 450 have their first terminals electrically connected to the collector electrode of transistor 440. The opposite terminals of capacitors 449 and 450 are connected to an output terminal 447 which is connected to certain conductive segments of the printed circuit disc 320' (or 320 of FIGURE 1b).

Thus, capacitor 450 is connected to output terminal 450a which is electrically connected to certain other conductive segments of the printed circuit disc 320' of FIGURE 3 such that the programming means selectively open circuits and short circuits the terminals 447 and 450a under control of the binary code bits read from the shaft angle encoders by the programming means in a manner to be more fully described.

Coupled with this operation, the base electrode of transistor 460 is electrically connected through resistor 458 through an output terminal 459 which is electrically connected to certain of the conductive segments in printed circuit disc 320' for the purpose of selectively driving transistor 460 between conduction and saturation under the control of the code bits being sensed from the shaft angle encoders in a manner to be more fully described.

Referring now to FIGURE 4, the printed circuit disc 310 of FIGURE 1b is reproduced in FIGURE 4 and is designated by the numeral 310'. The printed disc 310' is provided with a plurality of conductive segments arranged in groups numbered 350 through 355 forming a substantially circular array adjacent the periphery of disc 310'. The first two groups of segments 350 and 351 are employed for the purpose of generating two binary code groups representative of the meter location identifying number. This example can be seen wherein both code groups are capable of representing any decimal digit from 0 through 9 so that any meter identifying number may be formed from 00 to 99. If it is desired, the binary code groups may represent alphabetic numerals so as to form any meter identifying alphabetic combination from AA to ZZ which is a total of 676 possible combinations as opposed to 100 possible decimal combinations.

It should be further understood that a greater or lesser number of groups than the groups 350 and 351 may be employed for the purpose of generating fewer or greater meter identifying code combinations. Since the meter encoder transmitter installation will more than likely be permanently installed at a subscriber location, it is, therefore, possible to permanently wire the meter identifying code into the encoder transmitter facility as it is unlikely that any identifying code modification will become necessary. However, it should be understood that the wiring of the meter identifying code representation may also be semi-permanent by nature; that is, it may take the form of an adjustable switching arrangement as opposed to a permanent wiring arrangement.

One method of wiring in of the binary code representations for the encoder transmitter facility described herein is shown in FIGURE 3 and is provided in the following manner:

Each of the segments 350a through 350f of the segment group 350 is provided with a suitable terminal adaptable for having a conductor connected thereto in any suitable manner such as, for example, by soldering thereto, one form of which may be the dip soldering method quite frequently employed in printed circuit applications. Each segment 350a through 350f is thereby connected to an associated conductor 350a' through 350f' respectively, all of which leads are connected to the terminal 450a of output device 400, shown in FIGURE 4, to provide the suitable code combination in the following manner:

While it should be understood that not all of the conductors 350a' through 350f' are necessary for purposes of describing connections to segment group 350, FIG- URE 3 shows a schematic block representation 390 containing contact pairs 390a through 390f, respectively.

One end of all contact pairs 390a through 390f are connected to common bus 391 which is, in turn, connected by means of lead 392 to terminal 450a of output device 400 shown in FIGURE 4. The opposite terminals of contact pairs 390a through 390f are connected, respectively, by means of conductors 350a' through 350f' to the conductor segments 350a through 350f of segment group 350.

Conductors 350a' through 350f' have been shown in dotted fashion in FIGURE 3, it being understood that they are connected to segments 350 through the underside of disc 320', in accordance with standard printed circuit techniques. The contact pairs 390a through 390f, shown only for purposes of describing the method of connection thereof are presented to show that selected ones of the segments 350a through 350f are electrically connected to terminals 450a of output device 400, while the remaining segments are not electrically connected to terminal 450a. This is shown by contact pairs 390a and 390c shown in the closed condition, while contact pairs 390b, 390d, 390e and 390f are shown in the open condition.

Thus, it can be seen that segment 350a is electrically connected to terminal 450a through the following current path:

Segment 350a, conductor 350a', closed contact path 390a, common bus 391, and lead 392 to terminal 450a, shown in FIGURE 4. Segment 350c is likewise electrically connected to terminal 450a in a similar manner through closed contact path 390c. The remaining segments, namely, segments 350b and 350f, however, are not electrically connected to terminal 450a. While the electrical connections to the segments of segment group 351 which make up the second coded character for the meter identifying code have not been shown connected, omission has been for the purpose of clarity, and it should be understood that these segments would be connected in a manner similar to the segments in segment group 350.

As was previously described, printed circuit disc 320' experiences no movement, either linear or rotational, but is adapted to cooperate with the rotationally movable eccentric disc 320', shown in FIGURE 1b, and described previously. Eccentric cam 320 has been described as being provided with a plurality of openings for receiving the sensing pins, such as for example, the sensing pin 321, shown in FIGURE 1b These sensing pins have been superimposed upon the surface of printed circuit disc 320', shown in FIGURE 3, wherein one such pin 501 is shown in FIGURE 3, which pin is so physically positioned within eccentric cam 320 as to make wiping contact with the segments of segment group 350 through 355. A second sensing pin 502 is further provided within eccentric cam 320 and is electrically connected with sensing pin 501 by jumper lead 503. Sensing pin 502 is so positioned within eccentric cam 320 as to make wiping contact with the arcuate segment 356 provided upon disc 320'.

The terminal 356a of arcuate segment 356 is electrically connected by means of lead 357 to terminal 459 of output device 400, shown in FIGURE 4. As was previously described, upon energization of motor means 230, shown in FIGURES 1b and 4, the motor cam 236 starts to rotate, thereby imparting rotational movement to eccentric cam 320.

As FIGURE 3 shows the esnsing pins of eccentric cam 320 superimposed upon disc 310', it will be appreciated that pins 501 and 502 and the jumper connection therebetween, namely, connection 503, move in the direction shown by arrow 550 of FIGURE 3 so as to experience rotational movement relative to the stationary disc No. 310'. A predetermined time period after initiation of rotation of eccentric cam 320 brings the sensing pins 501 and 502 into wiping engagement with the first segment 350a and arcuate segment 356 respectively. At this instant of time, the following current path exists:

Terminal 450a of output device 400 is electrically connected to lead 392, common bus 391, closed contact pair 390a, conductor 350a', conductor segment 350a, sensing pin 501, jumper 503, sensing pin 502, arcuate segment 356, arcuate segment terminal 356a and lead 357 to terminal 459 of output device 400. This current path thereby causes terminal 459 to be effectively electrically connected to terminal 450a and hence bus 450 and thereby connecting resistor 458 in parallel with resistance member 455 of the voltage divider formed by resistors 454 and 455. The parallel connection of resistors 455 and 458 provides a total resistance across these parallel terminals which is substantially less in ohmic value than the resistance of resistance member 455 alone causing the voltage level 456 to move closer in value to the voltage level of bus 450.

This causes transistor 460 to go from conduction to saturation thereby blocking any signal at its emitter output terminal namely the signal impressed upon the base electrode of transistor 460 by the oscillating circuit containing transistor 440. At this instant of time, no electrical connection is established between terminals 447 and 450a of output circuit 400 for a reason to be more fully described, thus establishing the operating frequency of the circuit comprised of transistor 440 by means of inductor 448 connected in parallel with the series connected capacitors 444 and 445 (assuming that the tuning capacitors 446 have not been employed during this time). Thus, the operating frequency established by inductor 448 and capacitors 444 and 445 is connected from the potentiometer comprised of resistor 441 and movable terminal 452 to the base electrode of transistor 460 by means of the A.-C. coupling capacitor 453, the transistor 460 having been keyed into the saturation state by means of the sensing pins 501 and 502 and jumper 503 therebetween which cooperate with the segments 350a and 356, thereby prevents the passage of the frequency signal generated by the circuit comprised of transistor 440 which appears at the emitter terminal of transistor 460 and is hence impressed across the primary winding 432 of transformer 429. The secondary winding 431 of transformer 429 couples the developed frequency signals through lines 401 and 402 for subsequent reception thereof by the communications channel (not shown).

As the rotatable eccentric cam moves still further in the direction shown by arrow 550 of FIGURE 3 the brush 502 remains in wiping contact with arcuate segment 356 while brush 501 makes wiping contact with the radially aligned segment 358. At this particular instant of time terminals 459 and 447 of output device 400 are not electrically connected to one another since the contact path 390b is in the open state. Therefore, at this particular time interval resistor 458 is not placed in parallel across the terminals of resistor 455 thereby placing transistor member 460 in the conductive state. Thus the signal frequency generated by the circuit comprised of transistor 440 is impressed upon the base electrode of transistor 460 and appears at the emitter terminal of transistor 460 due to the non-conductive state of this transistor member. The remaining conductive segments of the meter identifying code segment groups 350 and 351 are traversed by the sensing pin 501 in a manner similar to that described with respect to segments 350a and 350b.

Upon completion of the sweep of segment groups 350 and 351 by sensing pin 501, the motor means remains in the energized state causing eccentric cam 320 to move pin 501 into wiping engagement with the segment 352a of segment group 350. At this instant of time pin 502 is continuously wiping arcuate member 356.

The radially aligned segments 352a–352f of the meter data groups, however, are not permanently wired to generate predetermined binary code groups but are connected to the shaft angle encoders previously described and shown reproduced schematically as shaft angle encoder 117" in FIGURE 3. The shaft angle encoder is represented schematically by a plurality of contact pairs 113a″–113″, it being understood, however, that the shaft angle encoder is not actually comprised of six such contact pairs, but effectively operates in such a manner that the contact pairs are selectively opened and closed in predetermined combinations to form the binary coded representations for the decimal data to be transmitted.

It is important to note that in the intervals between each code group the transmitter facility of FIGURE 4 is in the energized state and thus transmits a tone during such intervals. The transmitter thus functions on the principle that a no tone interval, that is, an interval during which no tone is generated, represents, and will be recognized by the receiver facility as a binary one indication. This mode of operation has been chosen for the reason that during the interval between the time that the last code group of the meter information code group has been transmitted and the time that the transmission cycle is terminated a steady tone is transmitted. This steady tone is utilized by the receiver facility to identify the completion of the transmission cycle such that the time duration of this tone provides the completion of transmission indication.

As one example, let it be assumed that the shaft angle encoder representation 117″ occupies an angular position which may be represented in FIGURE 3 such that the contact pairs 117a″ and 117c″ are in the closed position, while the remaining contact pairs are in the open condition. The first terminal of each contact pair is connected to common bus 117g″ which, in turn, is connected by means of lead 117h″ to the terminal 450a of reference potential bus 450. The opposite terminals of the contact pairs 117a″ through 117f″ are connected respectively, by means of conductors 352a′ through 352f′ to the terminals of conductive segments 352a through 352f. Thus, assuming the shaft angle encoder 117″ to be in an angular position such that the code represented by the contact pairs 117a″ through 117f″ occupy the positions shown in FIGURE 3, at the instant at which the sensing pin 501 makes wiping contact with the segment 352a, the following current path exists:

Terminal 450a to lead 357, arcuate segment 356, sensing pin 502, jumper connector 503, sensing pin 501, conductive segment 352a, conductor 352a′, closed contact pair 117a″, common bus 117g″ and conductor 117h″ to terminal 459 of output device 400. In this condition, resistor 458 is again impressed in parallel across the terminals of resistor 455 driving transistor 460 into saturation state, inhibiting signal frequencies generated by means of transistor 440 to pass through the circuit stage including transistor 460 to the primary winding 432 of transformer means 429. It will be assumed that a closed contact condition such as is shown by the contact pair 117a″ is representative of a binary one state, and this holds true with respect to the shaft angle encoder of representation 117′ as well as the permanent wiring for the meter identifying code group represented by the schematic block 390. Likewise, an open contact pair represents a binary zero condition. It should be understood, however, that these states may be reversed if so desired.

As eccentric cam 320 rotates still further in the direction shown by arrow 550, sensing pin 501 makes wiping contact with segment 352b of segment group 352. The contact pair 117b″ connected to segment 352b is in its open state so that resistor 458 is not connected in parallel across the terminals of resistor 455 so that transistor 460 moves from saturation to the conduction state. Thus, the signal frequency is passed to the primary winding 432 of transformer means 429 so that terminals 401 and 402 impress the signal frequency upon communications channel which is subsequently interpreted by the receiving facility (not shown) as the receipt of a binary zero condition during this time interval. The remaining segments 352c through 352f of the segment group 352 are swept by sensing pin 501 in a like manner as are the segment groups 353, 354 and 355.

The example of FIGURE 4 shows an arrangement whereby four code groups representative of four separate decimal digit positions are transmitted from the transmitter encoder location to the receiver facility. It should be understood that a greater or lesser number of such code groups may be employed depending strictly upon needs of the user. It should be understood further that the segment groups 353 through 355 are electrically connected to their associated shaft angle encoders in a manner similar to that shown for the segment group 352. Thus, the arrangement of FIGURE 3 is able to transmit meter information having a message length of four decimal digits, thus being capable of transmitting any decimal message from 0000 to 9999, which is a range of 10,000.

In addition to the sensing pins 501 and 502 already described, rotatable eccentric cam 320 is further provided with a second pair of sensing pins 504 and 505 electrically connected to one another by a jumper means 506. It should be understood that sensing pins 504 and 505 experience no rotational movement relative to the sensing pins 501 and 502, since all of the pins 501 through 505 are embedded in the rotatable eccentric cam member 320. Immediately prior to the initiation of rotation of eccentric cam member 320, sensing pins 504 and 505 occupy the angular positions relative to disc 310′ as are shown in FIGURE 3.

A first group of conductor segments provided for cooperating with the sensing pins 504 and 505 is comprised of the conductive segments 357, 359, 361, 363 and 367. Each of these segments are provided with terminals which are electrically connected to a jumper wire 393 by means of conductors 358, 360, 362, 364, 366 and 368 respectively. Jumper wire 393 is, in turn, electrically connected by means of leads 394 to terminal 447 of output device 400, shown in FIGURE 4.

The second group of conductor segments is comprised of segments 369, 371, 373, 375, 377 and 379. These segments are connected respectively, by means of leads 370, 372, 374, 376, 378 and 380 to a jumper lead 381 which, in turn, is electrically connected by means of lead 395 to terminal 450a of transmitter output device 400. It should be noted that the thickness of end portions 357a through 367a of segments 357 through 367 respectively, are substantially thicker than the portions 369a through 379a of segments 369 through 379 respectively, for a purpose to be more fully described. The segments 357 through 367 cooperate with sensing pin 504 and segments 369 through 379 cooperate with sensing pin 505 in the following manner:

Immediately prior to the rotation of eccentric cam 320, sensing pins 504 and 505 occupy the angular positions shown in FIGURE 3. Upon initiation of rotation of rotatable cam 320, sensing pin 505 first makes sliding engagement with portion 375a of conductive segment 375. Sensing pin 504 makes wiping engagement with portion 357a of conductive segment 357.

At this instant of time the following current path exists:
Terminal 450a of output device 400 is electrically connected to conductor 395, jumper 381, the output segment 375, sensing pin 505, jumper 506, sensing pin 504, conductive segment 357, lead 358, jumper 393 and lead 394 to terminal 447 of output device 400. This current path thereby causes capacitor 449 to be placed in parallel across the inductor 448. It should be understood that capacitor 450 would likewise be connected in parallel across inductor 448, but it will be assumed herein that capacitor 450 has not been used in the present example.

The presence of capacitor 449 thereby alters the operating frequency of the circuit comprised of transistor 440 and is such that the new signal frequency has a magnitude which may be easily distinguished from the previous operating frequency. This signal frequency is impressed upon transformer means 429 and through to the leads 401 and 402 so as to be transferred to the communications channel. This modified frequency output from the output device 400 is recognized at the receiver location as a start bit for the binary code groups which immediately follows it. This can be seen to be true from FIGURE 3 wherein it can be seen that the sensing pins 504 and 505 engage the conductor segments 357 and 375 respectively, at a time previous to the engagement of segment 350a of code group 350 by the sensing pin 501. Thus, each such altered frequency apprises the receiver facility that a six bit code group will follow each start bit. It should be understood that the choice of a six bit code group is optional and may be altered to be a code group of a greater or lesser number of code bits, depending strictly upon the needs of the user, with the proviso, however, that a sufficient number of code bits be present so as to provide a binary coded representation for a decimal number.

The same operation can be seen to be true with respect to the second group 351 of code bits such that when sensing pin 504 engages conductive segment 359 and concurrent therewith, when the sensing pin 505 engages the conductive segment 377, the altered signal frequency is transmitted at a time previous to the transmission of the first signal frequency which is transmitted at the time at which sensing pin 501 engages the conductive segment 351a of group 351. This can be seen to be true for the remaining four code groups 352 through 355 respectively of the disc 310'.

In order to automatically deenergize the transmitter encoder facility of the instant invention, rotating eccentric cam 320 is further provided with sensing pins 507 and 508 electrically connected by a jumper 509. These pins cooperate with conductive segments 398 and 399 in the following manner:

Upon the completion of the sweeping of all the conductive segments of segment groups 350 through 355, the sensing pins 507 and 508 move to the angular position, as shown in FIGURE 3. It should be carefully noted that the positions of sensing pins 507 and 508, shown in FIGURE 3, are not located directly with respect to the sensing pins 501, 502, 504 and 505, since the representation of sensing pins 507 and 508 have been for the positions which they occupy at the point near the completion of one rotation of eccentric cam 320, whereas the sensing pins 501 and 502 and 504 and 505, as shown in FIGURE 3, occupy the positions which they assume at or near the beginning of the rotational cycle of eccentric cam 320. Thus, the sensing pins 507 and 508 in actuality occupy different positions relative to the pins 501, 502, 504 and 505, other than that shown in FIGURE 3.

At the time at which the last segment 355f of segment group 355 is swept by the sensing pin 501, the sensing pins 507 and 508 occupy the positions as shown in FIGURE 3. Thus, sensing pin 507 makes wiping engagement with the segment portion 399a of conductive segments 399, and a predetermined time thereafter, sensing pin 508 makes wiping contact with the portion 398a of conductive segment 398. Conductive segment 399 is connected by means of lead 399b to terminal 551 of output device 400 which, in turn, is connected to the negative side or ground reference side 421 of the A.-C. source 410. Segment 398 is electrically connected by means of lead 398b to terminal 550 which in turn is connected to one terminal of resistor 420. Thus, at this instant of time, the current path exists from one side of resistance 420 to terminal 550, conductive segment 398, sensing pin 508, jumper 509, sensing pin 507, conductive segment 399 and lead 399b to terminal 551. This places resistor 420 in parallel across relay coil 412.

The value of the resistor 420 is so chosen as to effectively operate as a direct shunt across relay coil 412, causing substantially current flow to be diverted away from relay coil 412 and through the short circuit path including the resistance 420. Deenergization of relay coil 412 causes normally open contacts 423 and 413 (which are under the control of relay coil 412) to be moved to their normally open position, thereby opening or disengaging the contact pairs 423-424 and 413-414. The opening of contact pair 423-424 isolates the signal frequency circuit of the output device 400 from the communications channel, while the opening of contact pair 413-414 isolates the A.-C. source 410 from the motor means 230, thus automatically deenergizing both the motor means 230 and the frequency generating circuit portion of the output device 400.

The time delay device 419 is provided for the purpose of providing an alternating shunting means for the deenergization of relay coil 412 upon the occasion that the shorting strip comprised of sensing pins 507 and 508 and jumper 509 (in cooperation with segments 398 and 399) fails for any reason to operate in its routine manner. The time delay device 419 is chosen so as to provide approximately a three second time delay prior to the imposition of a short circuit condition across relay coil 412. The operation of the time delay device 419 is such that it contains a bimetal element which heats up sufficiently within a three second time period to actuate or close a circuit therein causing a direct short across the terminals of the time delay device 419. This imposes a short circuit condition across relay coil 412 which operates in the same manner as the shorting strip assembly 507-509-508 operates so as to divert current away from relay coil 412 and through time delay device 419. This operation causes the opening of contact pairs 413-414 and 423-424 in the same manner as was previously described.

It can therefore be seen that the instant invention provides a novel encoder transmitter facility which has the capabilities of being normally deenergized, energizable only upon the receipt of the transmit-request signal such that it automatically transmits binary coded data in response to such a transmit-request signal and upon completion thereof automatically deenergizes itself.

The encoder assembly is so designed as to be readily adjustable to provide any suitable contact pressure condition for the shaft angle encoders employed therein, and provides a pivotal arm automatically operative to move the sensing members of the least significant decimal digit shaft angle encoder out of wiping engagement so as to relieve the meter cyclometer device of any drag during periods in which transmission operation is not taking place, and further imposes such a significantly small drag force for such a significantly small current interval which is less than half of the entire transmission cycle, which, in any case, is no greater than two seconds, that the meter facility experiences no interference whatsoever from the accompanying encoder transmitter facility connected thereto.

The design of the programming means is such that the operating cam for moving the movable sensing members into engagement with their associated shaft encoder performs this operation in such a smooth, gradual manner that the forces necessary for adequate contact pressure exerted upon this shaft angle encoder do not disrupt the meter operation in any way whatsoever. In addition thereto, the movement of the movable sensing brushes occurs during the transmission cycle itself so that approximately the first ⅓ of the transmission cycle is employed for the purpose of moving the sensing brushes into engagement with their associated shaft encoder and simultaneously therewith the first group of conductive segments are being swept to key the transmitter. The next third of the transmission cycle is substantially the period during which the conductive segments associated with the least significant digit code bits are being read. The cam is therefore designed to maintain substantially constant contact pressure throughout this period. The remaining ⅓ portion of the transmission cycle is employed for sweeping the remaining conductive segments and simultaneously therewith the sensing members of the least significant digit are being disengaged from the shaft angle encoder. Thus it can be seen that substantially less than half of the transmission time cycle finds the movable sensing members in engagement with their associated shaft encoder. The programming means is so designed as to provide automatic sequencing of the condition of each shaft encoder as well as sequencing of the meter identifying code, each code group being preceded by a start bit of a different signal frequency from that of the code bits, and has further provisions for automatically terminating the transmission cycle. The programmer eccentric cam member serves the dual functions of simultaneously moving the sensing pins which sweep the printed circuit code disc and moving the movable sensing members into and out of engagement with its associated shaft encoder by means of the moving means reciprocating pin which follows the surface of the eccentric cam.

The programming means, the movable means for moving the movable sensing members and the shaft encoders are also further designed so as to be housed within the confines of the utility meter housing, thereby greatly facilitating the installation thereof.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Transmitter means for encoding and transmitting to a remote location data representative of a quantity being measured by means of a meter and responsive to a transmit request signal comprising encoding means for generating a binary coded representation of the quantity measurement even during the operation of said meter; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; the remaining sensing member groups being continuously engaged by their associated shaft angle encoders during both the energized and de-energized states of said transmitter; said programming means comprising actuating means for moving said disengaged sensing member group into engagement with its associated shaft angle encoder during a portion of the transmission cycle to permit all of said shaft angle encoders to key said transmitter means.

2. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said actuating means comprising pivotal means positioned between said programming means and said associated shaft angle encoder; a first end of said pivotal means being adapted to secure an associated group of sensing members; a second of said pivotal means being adapted to make sliding engagement with said programming means.

3. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said actuating means comprising pivotal means positioned between said programming means and said associated shaft angle encoder; a first end of said pivotal means being adapted to secure an associated group of sensing members; a second of said pivotal means being adapted to make sliding engagement with said programming means; said programming means comprising a rotatable cam means; said pivotal means being adapted to experience rotation upon rotation of said cam means.

4. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said actuating means comprising pivotal means positioned between said programming means and said associated shaft angle encoder; a first end of said pivotal means being adapted to secure an associated group of sensing members; a second of said pivotal means being adapted to make sliding engagement with said programming means; said programming means comprising a rotatable cam means; said pivotal means being adapted to experience rotation upon rotation of said cam means; said cam means being adapted to drive the associated sensing member group into sliding engagement with its associated shaft angle encoder during the first portion of its rotating cycle, to maintain this sliding engagement during the intermediate portion of its cycle and to drive said sensing member group out of sliding engagement with its associated shaft angle encoder during the last portion of its rotating cycle; said rotating cycle being one complete rotation and having a time duration substantially equal to said transmission cycle.

5. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said programming means comprising first means including an array of conductive segments electrically connected to said sensing member groups; rotatable cam means having a plurality of sensing pins; said sensing pins being adapted to make wiping contact with predetermined groups of said conductive segments for keying said transmitter means in accordance with the coded representations presented to said programming means by said shaft angle encoders.

6. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said programming means comprising first means including an array of conductive segments electrically connected to said sensing member groups; rotatable cam means having a plurality of sensing pins; said sensing pins being adapted to make wiping contact with predetermined groups of said conductive segments for keying said transmitter means in accordance with the coded representations presented to said programming means by said shaft angle encoders; normally de-energized motor means energizable upon the occurrence of a transmit request signal for rotating said cam means.

7. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said actuating means comprising pivotal means positioned between said programming means and said associated shaft angle encoder; a first end of said pivotal means being adapted to secure an associated group of sensing members; a second of said pivotal means being adapted to make sliding engagement with said programming means; said programming means comprising a rotatable cam means; said pivotal means being adapted to experience rotation upon rotation of said cam means; said cam means being adapted to drive the associated sensing member group into sliding engagement with its associated shaft angle encoder during the first portion of its rotating cycle, to maintain this sliding engagement during the intermediate portion of its cycle and to drive said sensing member group out of sliding engagement with its associated shaft angle encoder during the last portion of its rotating cycle; said rotating cycle being one complete rotation and having a time duration substantially equal to said transmission cycle; said programming means comprising first means including an array of conductive segments electrically connected to said sensing member groups; rotatable cam means having a plurality of sensing pins; said sensing pins being adapted to make wiping contact with predetermined groups of said conductive segments for keying said transmitter means in accordance with the coded representations presented to said programming means by said shaft angle encoders.

8. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means;

said actuating means comprising pivotal means positioned between said programming means and said associated shaft angle encoder; a first end of said pivotal means being adapted to secure an associated group of sensing members; a second of said pivotal means being adapted to make sliding engagement with said programming means; said programming means comprising a rotatable cam means; said pivotal means being adapted to experience rotation upon rotation of said cam means; said cam means being adapted to drive the associated sensing member group into sliding engagement with its associated shaft angle encoder during the first portion of its rotating cycle, to maintain this sliding engagement during the intermediate portion of its cycle and to drive said sensing member group out of sliding engagement with its associated shaft angle encoder during the last portion of its rotating cycle; said rotating cycle being one complete rotation and having a time duration substantially equal to said transmission cycle; said programming means comprising first means including an array of conductive segments electrically connected to said sensing member groups; rotatable cam means having a plurality of sensing pins; said sensing pins being adapted to make wiping contact with predetermined groups of said conductive segments for keying said transmitter means in accordance with the coded representations presented to said programming means by said shaft angle encoders; normally de-energized motor means energizable upon the occurrence of a transmit request signal for rotating said cam means.

9. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said actuating means comprising pivotal means positioned between said programming means and said associated shaft angle encoder; a first end of said pivotal means being adapted to secure an associated group of sensing members; a second of said pivotal means being adapted to make sliding engagement with said programming means; said programming means comprising a rotatable cam means; said pivotal means being adapted to experience rotation upon rotation of said cam means; said cam means being adapted to drive the associated sensing member group into sliding engagement with its associated shaft angle encoder during the first portion of its rotating cycle, to maintain this sliding engagement during the intermediate portion of its cycle and to drive said sensing member group out of sliding engagement with its associated shaft angle encoder during the last portion of its rotating cycle; said rotating cycle being one complete rotation and having a time duration substantially equal to said transmission cycle; said programming means comprising first means including an array of conductive segments electrically connected to said sensing member groups; rotatable cam means having a plurality of sensing pins; said sensing pins being adapted to make wiping contact with predetermined groups of said conductive segments for keying said transmitter means in accordance with the coded representations presented to said programming means by said shaft angle encoders; normally de-energized motor means energizable upon the occurrence of a transmit request signal for rotating said cam means, said first end of said actuating means being slotted; a reciprocating pin having a first end pivotally mounted to the slotted first end of said actuating means; the second end of said reciprocating pin being positioned to make sliding contact with the surface of said cam means and being adapted to follow said cam surface to urge the normally disengaged sensing member group into and out of sliding engagement with its associated shaft angle encoder.

10. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said actuating means comprising pivotal means positioned between said programming means and said associated shaft angle encoder; a first end of said pivotal means being adapted to secure an associated group of sensing members; a second of said pivotal means being adapted to make sliding engagement with said programming means; said programming means comprising a rotatable cam means; said pivotal means being adapted to experience rotation upon rotation of said cam means; said cam means being adapted to drive the associated sensing member group into sliding engagement with its associated shaft angle encoder during the first portion of its rotating cycle, to maintain this sliding engagement during the intermediate portion of its cycle and to drive said sensing member group out of sliding engagement with its associated shaft angle encoder during the last portion of its rotating cycle; said rotating cycle being one complete rotation and having a time duration substantially equal to said transmission cycle; said programming means comprising first means including an array of conductive segments electrically connected to said sensing member groups; rotatable cam means having a plurality of sensing pins; said sensing pins being adapted to make wiping contact with predetermined groups of said conductive segments for keying said transmitter means in accordance with the coded representations presented to said programming means by said shaft angle encoders; normally de-energized motor means energizable upon the occurrence of a transmit request signal for rotating said cam means, said first end of said actuating means being slotted; a reciprocating pin having a first end pivotally mounted to the slotted first end of said actuating means; the second end of said reciprocating pin being positioned to make sliding contact with the surface of said cam means and being adapted to follow said cam surface to urge the normally disengaged sensing member group into and out of sliding engagement with its associated shaft angle encoder, the second end of said reciprocating pin having a roller member for making rolling contact with said cam surface.

11. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means; said actuating means comprising pivotal means positioned between said programming means and said associated shaft angle encoder; a first end of said pivotal means being adapted to secure an associated group of sensing members; a second of said pivotal means being adapted to make sliding engagement with said programming means; said programming means comprising a rotatable cam means; said pivotal means being adapted to experience rotation upon rotation of said cam means; said cam means being adapted to drive the associated sensing member group into sliding engagement with its associated shaft angle encoder during the first portion of its rotating cycle, to maintain this sliding engagement during the intermediate portion of its cycle and to drive said sensing member group out of sliding engagement with its associated shaft angle encoder during the last portion of its rotating cycle; said rotating cycle being one complete rotation and having a time duration substantially equal to said transmission cycle; said programming means comprising first means including an array of conductive segments electrically connected to said sensing member groups; rotatable cam means having a plurality of sensing pins; said sensing pins being adapted to make wiping contact with predetermined groups of said conductive segments for keying said transmitter means in accordance with the coded representations presented to said programming means by said shaft angle encoders; normally de-energized motor means energizable upon the occurrence of a transmit request signal for rotating said cam means, said programming means having housing means for sealing said programming first means and cam means; said housing being adapted to be mounted with a meter housing.

12. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, adjustable means for positioning the remaining ones of said sensing member groups; said adjustable means being adapted to simultaneously adjust the contact pressure between said remaining ones of said sensing member groups and their associated shaft angle encoders.

13. Transmitter means for encoding and transmitting to a remote location data representative of a quantity being measured by means of a meter and responsive to a transmit request signal comprising encoding means for generating a binary coded representation of the quantity measurement even during the operation of said meter; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; the remaining sensing member groups being continuously engaged by their associated shaft angle encoders during both the energized and de-energized states of said transmitter; said programming means comprising actuating means for moving said disengaged sensing member group into engagement with its associated shaft angle encoder during a portion of the transmission cycle to permit all of said shaft angle encoders to sequentially key said transmitter means on a one-at-a-time basis wherein said disengaged encoder is in the engaged position for a period only slightly longer than its own keying period and substantially shorter than the entire keying period, said transmitter means comprising an energy source normally disconnected from said transmitter means; monitoring means responsive to a transmit request signal for connecting said energy source to said programming means to initiate the transmission cycle.

14. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal even during the operation of said meter; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; the remaining sensing member groups being continuously engaged by their associated shaft angle encoders during both the energized and de-energized states of said transmitter; said programming means comprising actuating means for moving said disengaged sensing member group into engagement with its associated shaft angle encoder during a portion of the transmission cycle to permit all of said shaft angle encoders to sequentially key said transmitter means on a one-at-a-time basis wherein said disengaged encoder is in the engaged position for a period only slightly longer than its own keying period and substantially shorter than the entire keying period, said transmitter means comprising an energy source normally disconnected from said transmitter means; monitoring means responsive to a transmit request signal for connecting said energy source to said programming means to initiate the transmission cycle; said monitoring means comprising relay means operative upon connection of said energy source to said motor means for maintaining said connection.

15. Transmitter means for encoding and transmitting to a remote location data representative of a quantity being measured by means of a meter and responsive to a transmit request signal comprising encoding means for generating a binary coded representation of the quantity measurement even during the operation of said meter; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; the remaining sensing member groups being continuously engaged by their associated shaft angle encoders during both the energized and de-energized states of said transmitter; said programming means comprising actuating means for moving said disengaged sensing member group into engagement with its associated shaft angle encoder during a portion of the transmission cycle to permit all of said shaft angle encoders to sequentially key said transmitter means on a one-at-a-time basis wherein said disengaged encoder is in the engaged position for a period only slightly longer than its own keying period and substantially shorter than the entire keying period; motor means for driving said transmitter means comprising an energy source normally disconnected from said transmitter means; monitoring means responsive to a transmit request signal for connecting said energy source to said programming means to initiate the transmission cycle; motor means for driving said programming means; said monitoring means comprising relay means operative upon connection of said energy source to said motor means for maintaining said connection, said programming means having shorting means connected in parallel with said relay means for de-energizing said relay means at the completion of said transmission cycle to disconnect said motor means and said energy source.

16. Transmitter means for encoding and transmitting to a remote location data respresentative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, said transmitter means comprising an energy source normally disconnected from said transmitter means; monitoring means responsive to a transmit request signal for connecting said energy source to said programming means to initiate the transmission cycle, said transmitter means comprising an electronic circuit for generating signals representative of said binary coded representations; said circuit comprising a first stage for generating signals of a predetermined frequency and a second stage for impressing the output signals of said first stage upon a communications channel.

17. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, said transmitter means comprising an energy source normally disconnected from said transmitter means; monitoring means responsive to a transmit request signal for connecting said energy source to said programming means to initiate the transmission cycle, said transmitter means comprising an electronic circuit for generating signals representative of said binary coded representations; said circuit comprising a first stage for generating signals of a predetermined frequency and a second stage for impressing the output signals of said first stage upon a communications channel, said first stage being adapted to generate a signal of a first predetermined frequency for representing the start bit for the binary coded representations of each shaft angle encoder.

18. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, said transmitter means comprising an energy source normally disconnected from said transmitter means; monitoring means responsive to a transmit request signal for connecting said energy source to said programming means to initiate the transmission cycle, said transmitter means comprising an electronic circuit for generating signals representative of said binary coded representations; said circuit comprising a first stage for generating signals of a predetermined frequency and a second stage for impressing the output signals of said first stage upon a communications channel, said first stage being adapted to generate a signal of a first predetermined frequency for representing the start bit for the binary coded representations of each shaft angle encoder, and being further adapted to generate signals of another predetermined frequency representative of said binary coded representations.

19. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, said transmitter means comprising an energy source normally disconnected from said transmitter means; monitoring means responsive to a transmit request signal for connecting said energy source to said programming means to initiate the transmission cycle, said transmitter means comprising an electronic circuit for generating signals representative of said binary coded representations; said circuit comprising a first stage for generating signals of a predetermined frequency and a second stage for impressing the output signals of said first stage upon a communications channel, said first stage being adapted to generate a signal of a first predetermined frequency for representing the start bit for the binary coded representations of each shaft angle encoder, and being further adapted to generate signals of another predetermined frequency representative of said binary coded representations, said communication channel being a telephone line said first and second stages being biased by the voltage level normally imposed upon said telephone line; means for maintaining the biasing voltage at a constant level.

20. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, said transmitter means comprising an energy source normally disconnected from said transmitter means; monitoring means responsive to a transmit request signal for connecting said energy source to said programming means to initiate the transmission cycle, said transmitter means comprising an electronic circuit for generating signals representative of said binary coded representations; said circuit comprising a first stage for generating signals of a predetermined frequency and a second stage for impressing the output signals of said first stage upon a communications channel, said first stage being adapted to generate a signal of a first predetermined frequency for representing the start bit for the binary coded representations of each shaft angle encoder, and being further adapted to generate signals of another predetermined frequency representative of said binary coded representations, said communication channel being a telephone line said first and second stages being biased by the voltage level normally imposed upon said telephone line; means for maintaining the biasing voltage at a constant level, said voltage regulating means comprising a zener diode.

21. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, said transmitter means comprising an energy source normally disconnected from said transmitter means; monitoring means responsive to a transmit request signal for connecting said energy source to said programming means to initiate the transmission cycle, said transmitter means comprising an electronic circuit for generating signals representative of said binary coded representations; said circuit comprising a first stage for generating signals of a predetermined frequency and a second stage for impressing the output signals of said first stage upon a communications channel, said first stage being adapted to generate a signal of a first predetermined frequency for representing the start bit for the binary coded representations of each shaft angle encoder, and being further adapted to generate signals of another predetermined frequency representative of said binary coded representations, said communication channel being a telephone line said first and second stages being biased by the voltage level normally imposed upon said telephone line; means for maintaining the biasing voltage at a constant level, buffer means connected between said second stage and said telephone line.

22. Transmitter means for encoding and transmitting to a remote location data representative of a quantity being measured by means of a meter and responsive to a transmit request signal comprising encoding means for generating a binary coded representation of the quantity measurement; normally de-energized transmitter means for generating frequency signals and transmitting said signals to a remote location in response to a transmit request signal; programming means for keying said transmitter means in accordance with said binary coded representations; said encoding means comprising a plurality of shaft angle encoders adapted to generate a predetermined binary code representative of discrete shaft angle positions; a plurality of groups of sensing members each being positioned to make wiping contact with an associated shaft angle encoder; at least one of said sensing member groups being disengaged from its associated shaft angle encoder when said transmitter is in its de-energized state; said programming means comprising actuating means for moving said disengaged sensing member group into engagement with its associated shaft angle encoder during a portion of the transmission cycle to permit all of said shaft angle encoders to key said transmitter means, said transmitter means comprising an energy source normally disconnected from said transmitter means; monitoring means responsive to a transmit request signal for connecting said energy source to said programming means to initiate the transmission cycle, said transmitter means comprising an electronic circuit for generating signals representative of said binary coded representations; said circuit comprising a first stage for generating signals of a predetermined frequency and a second stage for impressing the output signals of said first stage upon a communications channel; said second stage being controlled by said programming means to selectively block transfer of said first output signals in accordance with the binary state of said binary coded representations.

23. A device mountable within a meter housing for transmitting encoded information indicative of said meter reading and in response to a transmit request signal wherein said meter includes a cyclometer apparatus comprising register means providing a visually observable reading for said meter; an encoder assembly comprising a plurality of shaft angle encoders for continuously generating a binary coded representation of said meter reading; programming means associated with said encoder assembly comprising a programmer housing mounted within said meter housing in close proximity to said encoder assembly; said programming means including an eccentric rotatable disc; reciprocating means controlled by said disc operatively coupled to said encoder assembly for driving said sensing means into wiping engagement with said encoder assembly during a transmission cycle and for disengaging said sensing means from said encoder assembly upon completion of said transmission cycle to minimize drag forces imposed upon said cyclometer.

References Cited by the Examiner
UNITED STATES PATENTS
2,733,008   1/1956   D'Andrea et al. _____ 235—92

MAYNARD R. WILBUR, *Primary Examiner.*

DARYL W. COOK, *Assistant Examiner.*